Figure 1:
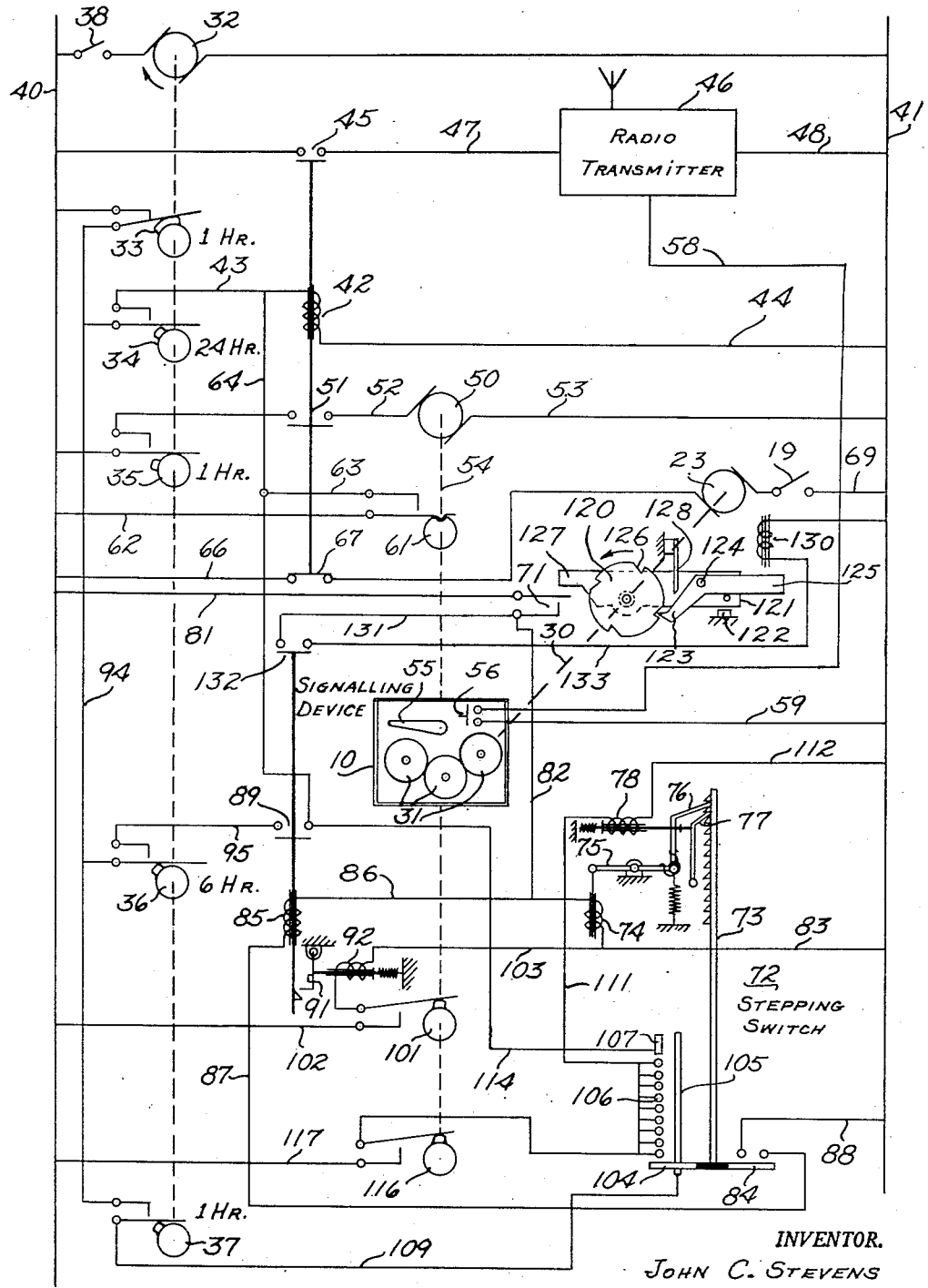

June 16, 1953        J. C. STEVENS        2,642,564

RADIO REPORTING PRECIPITATION GAUGE

Filed Sept. 15, 1951        2 Sheets-Sheet 1

INVENTOR.
JOHN C. STEVENS
BY
Attorneys

June 16, 1953 J. C. STEVENS 2,642,564
RADIO REPORTING PRECIPITATION GAUGE
Filed Sept. 15, 1951 2 Sheets-Sheet 2

INVENTOR.
JOHN C. STEVENS
BY
Attorneys

Patented June 16, 1953

2,642,564

UNITED STATES PATENT OFFICE 2,642,564

RADIO REPORTING PRECIPITATION GAUGE

John C. Stevens, Portland, Oreg., assignor to Leupold & Stevens Instruments, Inc., Portland, Oreg., a corporation of Oregon Application September 15, 1951, Serial No. 246,729

9 Claims. (Cl. 340—201)

The present invention relates to an electrical system and apparatus for transmitting information to a distant point and more particularly, to means for producing and transmitting signals representing varying amounts of precipitation which might occur at the particular location of the installation.

In using streams, lakes, reservoirs and other water systems for power, or navigation, and particularly in controlling floods, it is desirable to be able to rapidly obtain information as to the amount of precipitation occurring at various selected points in the particular watershed. Information obtained quickly in this manner enables accurate forecast of water run-off and river heights by a central dispatching office and permits adequate preparations to be made for conditioning the gates of various dams along the waterways for the anticipated variations in flow. The stream flow may thus be controlled to a greater degree and the possibility of damage due to floods averted or minimized.

It is an object of the present invention to provide a precipitation information transmission apparatus whereby information concerning the amount and rate of precipitation may be quickly and accurately furnished to a remote information collection office.

A further object of the invention is to provide an apparatus of the type described by means of which reports are transmitted at only long intervals of time during periods of no precipitation, at intermediate intervals of time during conditions of normal precipitation and at short intervals of time during periods of abnormally heavy precipitation.

In accordance with the herein described embodiment of the invention, a precipitation gauge is provided in conjunction with associated means for transmitting, such as by radio, to a central office periodic reports corresponding with data measured by the gauge. The apparatus associated with the gauge is so arranged that during conditions of no precipitation, reports are transmitted to the office only at 24-hour intervals but during conditions of normal precipitation the apparatus automatically functions to transmit reports to the office at 6-hour intervals and each time reporting the actual amount of precipitation recorded during the preceding 6-hour period. During conditions of abnormally heavy precipitation, however, the apparatus automatically functions to transmit reports hourly. Following any period of precipitation, the apparatus is automatically restored to its original condition for reporting at 24-hour intervals.

As will become readily apparent to one skilled in the art following a perusal of the following disclosure, the subject invention is not necessarily limited in its application to reporting conditions of precipitation, but may be adapted for reporting or transmitting information regarding measured increases of any nature or condition which might be subject to variation.

For a consideration of what is believed to be inventive and patentable, attention is directed to the following description taken in connection with the accompanying drawings while the features of novelty will be pointed out with greater particularity in the appended claims.

Figure 2:
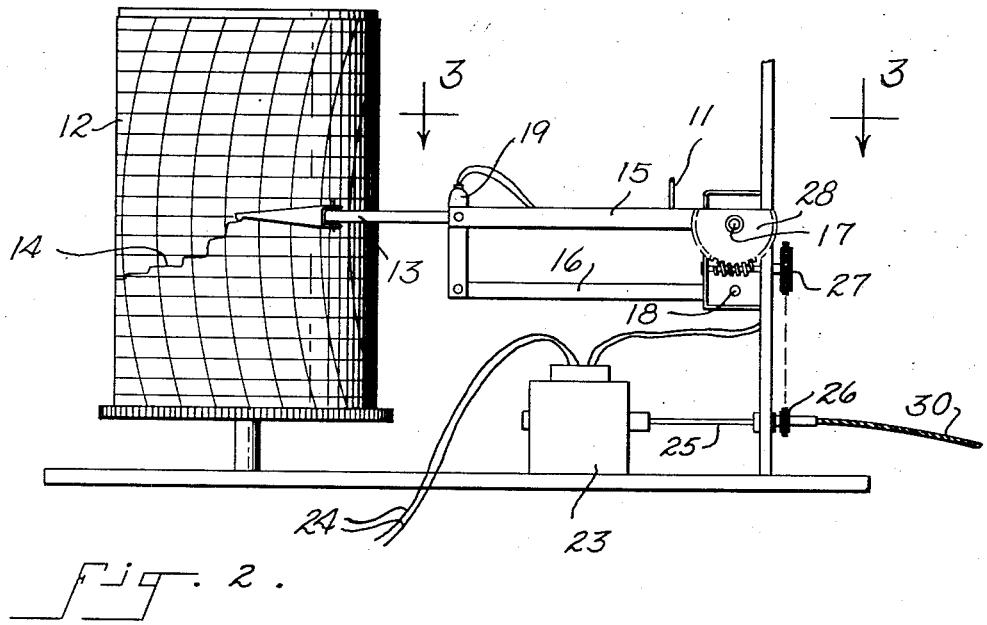
Figure 3:
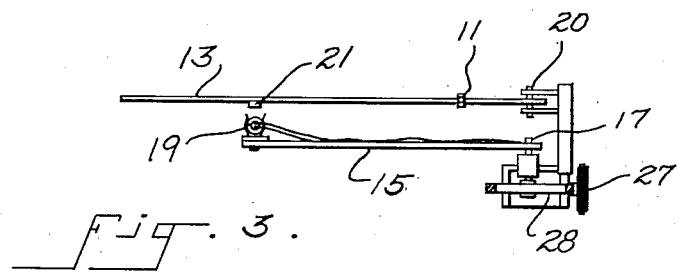

In the drawings, Fig. 1 is a schematic wiring diagram illustrating in simplified diagrammatic form the principal component parts incorporated in the present invention;

Fig. 2 is a fragmentary diagrammatic view illustrating certain portions of a recording precipitation gauge; and Fig. 3 is a view taken along the line 3—3 of Fig. 2.

In the United States Patent No. 2,146,999 dated February 14, 1939, issued to John C. Stevens and entitled "Signaling Apparatus and System," there is disclosed an apparatus for transmitting signals to a remote point in response to varying conditions such as levels of a liquid, positions of gates, valves or other movable objects. The apparatus of the present invention incorporates as a component part thereof a signaling device similar to that disclosed in Figs. 1 and 11 thereof, but modified in certain details as will be pointed out. Reference to the specification and drawings of the said prior patent may be had for a more complete understanding of the present invention and for the sake brevity herein the basic elements of the signaling device therein disclosed will be mentioned only briefly.

The signaling apparatus as described in the aforementioned patent consists essentially of a plurality of disc elements arranged closely adjacent each other and rotatable in a common plane about parallel axes. The upper surfaces of the discs are provided with upstanding concentric ribs of varying number in successive segments from one to nine. The discs are geared together and operatively connected through a notching drive mechanism to a condition responsive means. In the patent, the condition responsive means is described as a float which adjusts the positions of the discs according to varying liquid levels. At periodic intervals a scanning or sweep arm arranged cooperatively adjacent the discs, scans or sweeps thereacross and electrical contacts associated therewith make and break an electrical circuit as the end of the sweep arm rides over the ribs on the upper surfaces of the discs. Electrical impulses thus created by the contacts associated with the sweep arm are transmitted over telephone lines, as described in the patent, to a central office. A timer motor causes the sweep arm to traverse the discs at regular periodic intervals. Signaling apparatus of the type described in the aforesaid patent and substantially in the form shown are now in widespread usage and the functioning thereof is now well understood by those skilled in the art.

The present apparatus utilizes a signaling device similar to that described in the patent but modified so that the discs are rotatably notched in the forward direction pursuant to movements of the pen arm of a recording type precipitation gauge while the electrical impulses created by the contacts associated with the sweep arm are transmitted by radio to the central office. Moreover, instead of the sweep arm being actuated only at regular periodic intervals, according to the present invention the sweep arm is rotated at varying periodic intervals determined by the amount and rate of precipitation.

In Fig. 1 the signaling device is shown at 10 and which may be a device of the type disclosed in the said aforementioned patent, although as will be readily understood by those skilled in the art, following a study of the instant specification, the present invention is not to be necessarily so limited inasmuch as any other totalizing and impulse generating unit accomplishing substantially similar results may be substituted therefor.

As previously mentioned, the present apparatus and system is adapted for use with a recording tape rain gauge which may include a drum 12 (see Fig. 2) or other means for supporting a chart upon which a record of precipitation may be recorded by means of a pen arm 13. The pen arm 13 is, of course, operatively connected by connection means 11 to the precipitation collector (not shown). The pen arm 13, as is readily understood by those skilled in the art, starts in the empty condition of the collector in the lowermost position relative to the chart and as precipitation accumulates within the collector, the outer end of the pen arm is raised progressively, producing the record indicated by line 14 upon the chart. The specific form of the precipitation gauge or the recording mechanism is not essential to the present invention which does include, however, a modification in the form of an addition to the recording mechanism of a follower means associated with the pen arm for controlling the energization of an electric motor which in turn is operated in accordance with movements of the pen arm.

It will be obvious to those skilled in the art that any suitable following means may be provided and that the invention is not necessarily to be limited to the particular form of mechanism as shown in this instance. As shown in Fig. 2, the follower mechanism includes a parallelogram of hinged arms 15 and 16 pivotally supported at adjacent ends at 17 and 18 respectively, the pivot 17 being axially aligned with the pivot 20 for the recording pen arm 13. Supported upon the outer end of the parallelogram is a small make-and-break switch device 19 of the sealed glass tube type and having a magnetic armature element connected to the movable contact member therewithin. Mounted upon the pen arm 13 and immediately adjacent the switch device 19 is a relatively small permanent magnet 21 shown more clearly in the fragmentary detail view of Fig. 3. The armature of the switch device 19 is critically sensitive to the location of the permanent magnet 21 adjacent thereto and effects opening of the switch contacts only when the switch device 19 is in a predetermined precise condition of adjustment with respect thereto. In the positions shown in Figs. 2 and 3, the parallelogram arm 15 supporting the switch device 19 is exactly parallel with the pen arm 13. Now assuming that the pen arm moves upwardly in response to an increase in the precipitation accumulated in the receptacle or collector, as soon as the permanent magnet 21 moves away from its previous position adjacent the switch 19, the contacts of the switch 19 are closed, thereby effecting energization of the electric motor 23 which is connected to a source of power supply. Upon energization of the motor 23, the shaft 25 thereof is rotated and through the intermediary of suitable gearing or other drive connection represented by the elements 26, 27 and 28, the parallelogram is shifted upwardly so as to follow the movement of the pen arm 13. As soon as the armature of the switch device 19 reaches a position directly opposite the permanent magnet 21, the contacts of the switch device are opened, thereby de-energizing the electric motor 23. A flexible driving shaft or cable 30 is also connected to the motor shaft 25 and which driving connection, as indicated in the schematic diagram of Fig. 1, is operatively connected to the signaling device 10 for positioning the indicator discs 31 thereof. It will thus be seen that the discs 31 of the signaling device will at all times be adjusted to a position corresponding to the condition of adjustment of the movable pen arm 13 of the precipitation recording device. The discs 31 may therefore be termed totalizing elements which at all times indicate the total amount of precipitation accumulated in the gauge collector. The arrangement of the motor 23, as well as the switch 19, in the electrical control circuit for the system is also shown in the schematic diagram of Fig. 1.

Referring now to the schematic diagram of Fig. 1, the remainder of the apparatus and the operation thereof will be described.

The apparatus includes a time switch consisting of a timer motor 32, which may be either a mechanical or an electric clock, operatively connected for driving a plurality of switch devices indicated generally at 33, 34, 35, 36 and 37. For the sake of clarity of presentation, these are shown in the drawing as being cam operated. The cams of the last mentioned switch devices are so connected through suitable intermediary gearing to the motor 32 that the contacts of switches 33, 35 and 37 are closed once each hour but at slightly different times with respect to each other as will be explained, the contacts of the switch 34 once each 24 hours while the contacts of switch 36 are closed once each 6 hours. It is not believed necessary to show the switch mechanisms in detail since such time switch arrangements in varying forms are well known in the art.

A master control switch 38 is provided which, when closed, places the system in operation, energizing the timer motor 32 by connecting the same across the power supply lines indicated at 40 and 41. If a mechanical weight or spring-driven clock motor is substituted for the electrical clock motor 32, then, of course, switch 38 may be omitted. We will first assume a continued condition of no precipitation, and in which event radio reports will be transmitted at the end of each 24-hour period and times for commencement of each transmission will for reference purposes be hereinafter designated as "T" time. By appropriate adjustment of the associated cam, the contacts of switch 33 will close some time, such as two or three minutes, in advance of "T" time. About 60 seconds before the scheduled "T" time, the contacts of the time switch 34 will close, thereby completing an energizing circuit for the solenoid 42, which energizing circuit extends from the conductor 40 through the contacts of the time switch 33, through the contacts of the time switch 34, through conductor 43, to one terminal of the solenoid 42 and through the conductor 44 to the other supply line 41. Upon energization of the solenoid 42, the various contacts associated therewith will close, including the pair of contacts 45 which energizes the radio transmitter 46 through the conductors 47 and 48. The advance energization of the radio transmitter 46 permits the various tubes thereof to warm up and to become conditioned for broadcast operation. At "T" time the switch 35 closes its contacts, thereby establishing an energizing circuit for the scanner motor 50 through the pair of contacts 51, which were also closed upon the energization of the solenoid 42, and through conductors 52 and 53. As indicated by the dotted line 54, the motor 50 is connected to the scanner arm 55 of the signaling device 10 and will cause the same to make a complete revolution traversing the indicator discs 31. As previously mentioned, a pair of contacts, indicated at 56, are incoporated in the signaling device and operatively associated with the arm 55 which contacts are momentarily closed as the arm 55 engages with each of the raised ribs in the path of travel of the end of the scanner arm on the upper surfaces of the indicator discs 31. The contacts 56 are connected in a circuit including conductors 58 and 59 extending to the radio transmitter 46 so that electrical impulses created by opening and closing of the contacts 56 are broadcast by the transmitter 46 to the central office. During periods of no precipitation, the same series of impulses will be broadcast each 24-hour period. As soon as the motor 50 begins to rotate, however, a switch device 61 operatively connected to the motor shaft 54 closes its contacts, thereby establishing a holding circuit for the solenoid of the relay 42 through conductors 62, 63 and 64, by-passing the contacts of the time switches 33 and 34 to insure that once the scanner motor 50 has been energized, it will not be de-energized until after the scanning arm 55 has completed one or more complete revolutions.

Upon completion of the selected number of revolutions of the arm 55 of the signaling device 10, the contacts of the switch 61 will open. In actual practice, it is preferred to repeat any given broadcast a plurality of times in immediate succession as a precautionary measure in the event of momentary interference with the broadcast transmission such as due to static conditions which sometimes occur such as during storms. Accordingly, the switch 61 may be coupled to the shaft 54 through gearing so that the cam of the switch device 61 will make one complete revolution while the scanning arm 55 of the signaling device 10 makes a series of three or more revolutions over the indicator discs 31. In any event, by the time that the cam associated with the switch device 61 has made one complete revolution, the contacts of both switches 33 and 34 will have been restored to their normally opened condition due to continued rotation of the timer motor 32.

So long as no precipitation occurs, the preceding described operation will continue at the end of each 24-hour period at "T" time. Suppose now, however, that it commences to rain and in which event the pen arm 13 associated with the precipitation gauge moves upwardly so that the electric switch 19 closes its contacts to energize the motor 23 for a period of time until the position of the parallelogram arms 15 and 16 are readjusted to match the degree of movement of the pen arm 13. Energization of the motor 23 upon closure of the contacts 19 is accomplished from the conductor 40 through the conductor 66, the closed contacts 67 of the solenoid relay 42, conductor 68 and conductor 69 to the other side of the source of supply 41. It will thus be seen that the motor 23 cannot be energized during the time that the relay 42 is picked up and while a broadcast is being made. Thus it is insured that the indicator discs 31 will not be actuated during such time as the scanning arm 55 is being rotated. As described in the aforementioned Letters Patent, the discs 31 are adjusted with a step-by-step movement and by suitable gearing connection to the driving motor 23 are notched forwardly one step with each one-hundredth of an inch of precipitation. Operatively connected between the driving motor 23 and the signaling device 10 is a further switch 71, the contacts of which are closed momentarily with each two-hundredths of an inch of precipitation. In other words, the contacts of the switch 71 are momentarily closed each time that the indicator discs 31 are readjusted forwardly by two steps. Closure of the contacts of the switch 71 effects a step-by-step adjustment of the cumulative stepping switch device indicated generally at 72. This latter device is shown schematically as consisting of a notched member, or rack bar, 73 adapted to be raised one step at a time upon energization of the solenoid 74. As indicated schematically, the armature of the solenoid 74 is connected through a pivoted lever 75 to a ratchet 76 so that upon each downward movement of the solenoid armature the rack bar 73 is raised upwardly one step and in which position, the bar is retained by means of the retaining dog 77. The armature of a releasing relay 78 is in turn connected to the dog 77 so that upon energization of the relay 78, both elements 77 and 76 are adjusted to a disengaged position relative to the bar 73 permitting the latter to drop to its lowermost position as shown in the drawings. Associated with the lower end of the bar 73 are groups of contacts which will be described more fully hereinafter.

Upon each closure of the switch device 71 the notching relay 74 will be energized through the conductor 81 extending between the supply conductor 40 and the contacts of the switch 71, from thence through the conductor 82, the relay 74, through conductor 83 to the other supply line 41. Upon upward movement of the rack bar 73 of the stepping relay 72 a first bridging contact member 84 closes a pair of contacts associated therewith, thereby establishing an energizing circuit for the relay 85. This energizing circuit extends from the supply conductor 40 through the conductor 81, closed contacts of the switch 71, conductors 82 and 86, through the relay 85, conductor 87, the closed contacts of the switch 84, conductor 88 to the other supply conductor 41. The relay 85 is of the latched-closed type so that the pair of contacts 89 associated with the relay 85 will be retained in the closed position following momentary energization of the coil of relay 85. The latching mechanism for the relay 85 includes a latch 91 together with a latch-releasing coil 92.

In the schematic wiring diagram of Fig. 1, the contacts of switch 71 are shown as being adapted to be actuated to the closed position by means of a notched disc 120 operatively connected to the shaft between motor 23 and the signaling device 10. A rocker member 121 is pivotally mounted for free rotation coaxially with and immediately adjacent the disc 120 and normally biased by its own weight to a position of rest against the stationary stop 122. A pawl 123 is pivotally mounted as at 124 upon the rocker member 121 and by reason of the overbalancing outer end portion 125 the pawl 123 normally rides against the periphery of the disc 120 so that it will engage with the notches 126 provided in the edge of the disc. Upon rotation of the disc 120 by shaft 30 in the counterclockwise direction as indicated, and upon engagement of the pawl 123 in one of the notches 126, the rocker member 121 will also be rotated in the counterclockwise direction through such an angle of movement until the opposite end portion 127 of the rocker member engages with switch 71 and effects closure of the contacts thereof. After contacts 71 have closed, continued rotational movement of the rocker member 121 will cause the pawl 123 to engage with the stationary stop 128 and which will force the pawl 123 free of the notch 126, whereupon the rocker member 121 will drop back upon the rest 122.

It will be obvious that the motor 23 might stop at such an angle of rotation that the disc 120 would hold the contacts 71 in the closed circuit condition and not move sufficiently to effect disengagement of the pawl 123 through engagement of the latter element against the stop 128. In such event, the solenoids of relays 74 and 85 would be maintained in a continuously energized condition over an extended period of time and which might be detrimental. To preclude any such possibility, further means are provided for effecting disengagement of the pawl 123 from the disc 120 immediately following any closure of the switch contacts 71. A solenoid 130 is arranged above the magnetic pawl arm portion 125 and which solenoid is energized upon closure of the contacts 71 through conductor 131, closed contacts 132 of the latch-in relay 85, conductor 133, through the coil of solenoid 130, to the supply line 41. Upon energization of the solenoid 130, the pawl arm 125 is lifted, thereby effecting disengagement of the pawl 123 from the disc 120 independently of the stop 128.

Now assuming that the rate of precipitation is more or less normal, the condition will be reported at the end of the next regular 6-hour period following initial closure of the switch 84 of the cumulative stepping relay 72 and relay 85. As previously mentioned, the time switch 33 closes every hour several minutes in advance of "T" time, the actual broadcast time. The contacts of switch 36 close every six hours about one minute in advance of "T" time. Upon such closure of switches 33 and 36 a circuit is closed extending from the supply conductor 40, through the contacts of switch 33, through conductor 94, the contacts of the switch 36, conductor 95, the closed contacts 89 of the relay 85, conductor 96, to the solenoid of the relay 42, and through conductor 44 to the other supply line 41. Upon pick-up of the relay 42, the contacts 45 will be closed so as to effect preliminary warm-up of the radio transmitter 46. The contacts of the switch 35 will then close at "T" time to energize the motor 50 through the closed contacts 51 whereupon the arm 55 will be rotated traversing the indicator discs 31 and cause a broadcast to be transmitted over the radio 46 in a manner as previously described.

Immediately following said last mentioned broadcast, the relay 85 will be restored to its normal open circuit condition through operation of the switch device 101 which is also operatively connected to the shaft 54. The cam of the last mentioned switch device is driven at the same rotational speed as the cam of the maintain switch 61 so that the contacts associated with the switch device 101 are closed slightly after the closure of the contacts of the switch device 61. As previously pointed out, as soon as the contacts of the maintain switch 61 are closed, the solenoid of the relay 42 is maintained energized thereby to maintain the energization of the scanner motor 50 throughout the broadcast. Upon closure of the contacts of the switch device 101, the energization circuit is closed for the release coil 92 of relay 85 extending through the conductor 102, contacts of the switch device 101, conductor 103, conductor 83, to the supply line 41. The relay 85 will thereupon be unlatched and permitted to drop out, opening the contacts 89 thereof.

Referring now to the cumulative stepping device 72, attention is directed to the fact that a movable bridging contact member 104 is also connected to the rack bar 73 and which is adapted to make contact between a fixed contact 105 and either one of a plurality of adjacent step contacts 106. The contacts 106 are nine in number and, as previously mentioned, the bar 73 is notched upwardly at the rate of one step for each 0.02 inch of precipitation. In the maximum position of the stepping device 72, the contact member 104 engages with the upper limit contact 107 which indicates that an accumulation of 0.2 inch of precipitation has occurred. If less than 0.2 inch of precipitation occurs in any hour, the stepping device 72 is restored to zero condition through operation of the contacts of the timing switch device 37 driven by the timer motor 32. As previously mentioned, the contacts of the time switch 37 close sometime after the closure of the contacts of the time switch 33 but approximately one minute before any broadcast time. Upon closure of the contacts of the time switch 37, a circuit is closed extending through the conductor 94, contacts of the switch device 37, conductor 109, contact member 105 and bridging contact 104 to one of the contacts 106, through conductor 111, through the solenoid of the unlatching device 78, conductor 112 to the other side of the source of supply 41. The ratchet arms 76 and 77 are thus actuated to the releasing condition permitting the bar 73 to drop downwardly to the zero position.

Now assume that an accumulation of 0.2 inch of precipitation or more has occurred during any one hour period in which event the stepping device 72 will have been actuated to its upper limit condition in which the bridging contact 104 makes contact between contacts 105 and 107. Then upon closure of the contacts of the time switch 37 at the end of the hourly period, an energizing circuit will be completed through conductors 94, 109, the contacts 105, 104 and 107 of the cumulative stepping device 72, through conductors 114, 96, for the solenoid 42 and conductor 44 to the other side of the source of supply 41. This circuit is completed and maintained for about one minute before broadcast time as determined by the closure of the contacts of the timing switch 35. As soon as the last mentioned contacts are closed, then, as previously described, the motor 50 will be energized and once it has started to rotate, the maintain switch 61 is closed and the contacts of the time switches 34 and 37 may open. The scanning arm 55 of the signaling device is then rotated over the indicator discs 31 and a broadcast giving the actual amount of precipitation which has occurred during the hourly period is transmitted over the transmitter 46. Such hourly broadcast will be made so long as the precipitation continues at a rate of 0.2 inch per hour or greater.

For restoring the cumulative stepping device 72 to its zero position following each broadcast, a further switch device 116 is provided on the motor shaft 54, which device is arranged for operation in unison with the switch device 101 also provided on the shaft 54. The contacts of the switch device 116 are adapted to be clsed after the sweep motor 50 has commenced to rotate whereupon an energizing circuit for the tripping solenoid 78 will be completed through the conductors 117, the closed contacts of the switch device 116, conductors 111 and 112.

It is to be understood, of course, that the contacts of the time switch devices 36 and 37 will all close simultaneously with closure of the contacts of the 24-hour time switch device 34 at the end of every 24-hour period but such coincidental closure of said time switch devices does not give rise to any interference in the circuit arrangement as described. So also, it is possible that the contacts of both the switch devices 36 and 37 may close simultaneously at the end of 6-hour periods bot following such 6-hour broadcast both the relay 85 and the cumulative stepping switch device 72 are restored to their open circuit and zero positions, respectively.

Having described the invention in what is considered to be a preferred embodiment thereof, it is desired that it be understood that the specific details shown are merely illustrative and that the invention may be carried out in other ways.

I claim:

1. In a precipitation signaling system, the combination comprising a summation gauge means including an indicator movable in response to accumulations of precipitation, a signaling device including totalizing means operatively connected to said indicator for adjustment thereby in accordance with the movement of said indicator, said signaling device including means for creating electrical impulses corresponding to any condition of adjustment of said totalizing means, electrical transmission means connected to said signaling device for automatically transmitting information to a remote point simultaneously with the creation of and corresponding to said electrical impulses, a first timer operated switch operatively connected to said signaling device for causing regular periodic transmission of signals at long intervals of time irrespective of movement of said indicator during such long intervals, a cumulative stepping switch operatively connected to said indicator for step-by-step movement between zero and maximum positions proportional to movements of said indicator and together with the adjustment of said totalizing means by said indicator, a second timer operated switch means operatively connected to said stepping switch for restoring said stepping switch to zero position at the end of regular short intervals of time, a third timer operated switch means operatively connected to said signaling device and to said stepping switch for causing regular periodic transmission of signals at intermediate intervals of time in the event of any stepping movement of said stepping switch during any intermediate interval of time, and a fourth timer operated switch means operatively connected to said signaling device and to said stepping switch for causing regular periodic transmission of signals at the end of said short intervals of time in the event of movement of said stepping switch to maximum position during any such short interval of time.

2. In a signaling system, the combination comprising an indicator movable in response to variations in a given condition, a signaling device including totalizing means operatively connected to said indicator for adjustment thereby in accordance with the movement of said indicator, said signaling device including means for creating electrical impulses corresponding to any condition of adjustment of said totalizing means, electrical transmission means connected to said signaling device for automatically transmitting information to a remote point simultaneously with the creation of and corresponding to said electrical impulses, a first timer operated switch operatively connected to said signaling device for causing regular periodic transmission of signals at long intervals of time irrespective of movement of said indicator during such long intervals, a cumulative stepping switch operatively connected to said indicator for step-by-step movement between zero and maximum positions proportional to additive movements of said indicator and together with additive adjustment of said totalizing means by said indicator, a second timer operated switch means operatively connected to said stepping switch for restoring said stepping switch to zero position at the end of regular short intervals of time, a third timer operated switch means operatively connected to said signaling device and to said stepping switch for causing regular periodic transmission of signals at intervals of time intermediate said long and short intervals in the event of any stepping movement of said stepping switch during any such intermediate interval of time, and a fourth timer operated switch means operatively connected to said signaling device and to said stepping switch for causing transmission of signals at the end of any of said short intervals of time in the event of movement of said stepping switch to said maximum position during any such short interval of time.

3. In a signaling system, the combination comprising an indicator movable in response to variations in a given condition, a signaling device including totalizing means operatively connected to said indicator for adjustment thereby in accordance with the movement of said indicator, said signaling device including means for creating electrical impulses corresponding to any condition of adjustment of said totalizing means, electrical transmission means connected to said signaling device for automatically transmitting information to a remote point simultaneously with the creation of and corresponding to said electrical impulses, a first timer operated switch operatively connected to said signaling device for causing regular periodic transmission of signals at long intervals of time irrespective of movement of said indicator during such long intervals, a cumulative stepping switch operatively connected to said indicator for step-by-step movement between zero and maximum positions proportional to movements of said indicator and together with the adjustment of said totalizing means by said indicator, a second timer operated switch means operatively connected to said stepping switch for restoring said stepping switch to zero position at the end of regular short intervals of time, and a third timer operated switch means operatively connected to said signaling device and to said stepping switch for causing a transmission of signals upon movement of said stepping switch to maximum position during any of said short intervals of time.

4. In a signaling system, the combination comprising an indicator movable in response to variations in a given condition, a signaling device including totalizing means operatively connected to said indicator for adjustment thereby in accordance with the movement of said indicator, said signaling device including means for creating electrical impulses corresponding to any condition of adjustment of said totalizing means, electrical transmission means connected to said signaling device for automatically transmitting information to a remote point simultaneously with the creation of and corresponding to said electrical impulses, a first timer operated switch operatively connected to said signaling device for causing regular periodic transmission of signals at long intervals of time irrespective of movement of said indicator during such long intervals, a cumulative stepping switch operatively connected to said indicator for step-by-step movement between zero and maximum positions proportional to additive movements of said indicator and together with additive adjustment of said totalizing means by said indicator, a second timer operated switch means operatively connected to said stepping switch for restoring said stepping switch to zero position at the end of regular short intervals of time in the event of any movement of said stepping switch during any such short interval, a third timer operated switch means operatively connected to said signaling device and to said stepping switch for causing transmission of signals intermediate said long intervals of time in the event of a stepping movement of said stepping switch during any of said short intervals within one of said long intervals.

5. In a signaling system, the combination comprising an indicator movable in response to variations in a given condition, a signaling device including totalizing means operatively connected to said indicator for adjustment thereby in accordance with the movement of said indicator, said signaling device including means for creating electrical impulses corresponding to any condition of adjustment of said totalizing means, electrical transmission means connected to said signaling device for automatically transmitting information to a remote point simultaneously with the creation of and corresponding to said electrical impulses, a first timer operated switch operatively connected to said signaling device for causing regular periodic transmission of signals at long intervals of time irrespective of movement of said indicator during such long intervals, a cumulative stepping switch operatively connected to said indicator for step-by-step movement between zero and maximum positions proportional to movements of said indicator and together with the adjustment of said totalizing means by said indicator, a second timer operated switch means operatively connected to said stepping switch for restoring said stepping switch to zero position at the end of regular short intervals of time, and a third timer operated switch means operatively connected to said signaling device and to said stepping switch for causing a transmission of signals intermediate said long intervals of time in the event of a stepping movement of said stepping switch within said long interval.

6. In a signaling system, the combination comprising an indicator movable in response to variations of a given condition, a signaling device including totalizing means operatively connected to said indicator for adjustment thereby in accordance with the movement of said indicator, said signaling device including means for creating electrical impulses corresponding to any condition of adjustment of said totalizing means, electrical transmission means connected to said signaling device for automatically transmitting information to a remote point simultaneously with the creation of and corresponding to said electrical impulses, a first timer operated switch operatively connected to said signaling device for causing regular periodic transmission of signals at predetermined long intervals of time irrespective of movement of said indicator during such long intervals, a cumulative stepping switch operatively connected to said indicator for step-by-step movement between zero and maximum positions proportional to movements of said indicator and together with the adjustment of said totalizing means by said indicator, and a second timer operated switch means operatively connected to said signaling device and to said stepping switch for causing a transmission of signals intermediate said long intervals of time in the event of movement of said stepping switch within said long interval.

7. In a precipitation signaling system, the combination comprising an accumulative gauge means including an indicator movable in response to accumulations of precipitation, a signaling device including adjustable totalizing elements operatively connected to said indicator for adjustment in accordance with the movements of said indicator, said signaling device including means for scanning said totalizing elements and for creating electrical impulses corresponding to the conditions of adjustment of said totalizing elements, electrical transmission means connected to said signaling device for transmitting information to a remote point corresponding to said electrical impulses, a cumulative stepping switch operatively connected to said indicator for step-by-step movement together with adjustment of said totalizing elements, a first timer operated switch connected to said signaling device for causing periodic transmission of signals at predetermined long intervals of time during conditions of no precipitation, and a further timer operated switch connected to said signaling device and said stepping switch for causing operation of said signaling device at predetermined relatively short intervals of time during periods of heavy precipitation.

8. In a precipitation signaling system, the combination comprising an accumulative gauge means including an indicator movable in response to accumulations of precipitation, a signaling device including totalizing means operatively connected to said indicator for adjustment in accordance with degrees of movement of said indicator, said signaling device including means for scanning said totalizing elements and for creating electrical impulses corresponding to the conditions of adjustment of said totalizing elements, electrical transmission means connected to said signaling device for transmitting information to a remote point corresponding to said electrical impulses, a cumulative stepping switch operatively connected to said signaling device for step-by-step movement together with actuation of said totalizing elements, a first timer operated switch operatively connected to said signaling device for causing regular periodic transmission of signals at long intervals of time irrespective of movement of said indicator during such long intervals, a second timer operated switch operatively connected to said signaling device and to said stepping switch for causing regular periodic transmission of signals at intermediate intervals of time during conditions of moderate precipitation, and a third timer operated switch connected to said signaling device and said stepping switch for causing regular periodic transmission of signals of said signaling at short intervals of time during periods of heavy precipitation.

9. In a precipitation signaling system, the combination comprising an accumulative precipitation gauge including an indicator movable in response to accumulations of precipitation, a totalizing device, drive means operatively connecting said indicator to said totalizing device, a signal transmission means connected to said totalizing device, a time switch including a first switch unit connected to said totalizing device for causing transmission of signals at predetermined long intervals of time during periods of no precipitation, a stepping switch connected to said totalizing device for step-by-step adjustment in response to actuation of said totalizing device by said gauge indicator, said time switch including a second switch unit connected to said stepping switch and said totalizing device for causing transmission of signals at predetermined intermediate intervals during conditions of moderate precipitation, said time switch including a third switch unit connected to said stepping switch and to said totalizing device for causing transmission of signals at predetermined short intervals of time upon occurrence of precipitation, in excess of a predetermined moderate precipitation.

JOHN C. STEVENS.

References Cited in the file of this patent

UNITED STATES PATENTS

| Number | Name | Date |
|---|---|---|
| 2,176,886 | Campbell | Oct. 24, 1939 |
| 2,372,593 | McWhirter et al. | Mar. 27, 1945 |
| 2,466,099 | Hansen | Apr. 5, 1949 |
| 2,565,271 | Sealander et al. | Aug. 21, 1951 |